United States Patent
Lin et al.

(10) Patent No.: US 12,449,929 B2
(45) Date of Patent: Oct. 21, 2025

(54) ARRAY SUBSTRATE, DISPLAY PANEL, AND DISPLAY DEVICE

(71) Applicant: Xiamen Tianma Micro-Electronics Co., Ltd., Xiamen (CN)

(72) Inventors: Yiqiang Lin, Xiamen (CN); Hao Wu, Xiamen (CN)

(73) Assignee: Xiamen Tianma Micro-Electronics Co., Ltd., Xiamen (CN)

( * ) Notice: Subject to any disclaimer, the term of this patent is extended or adjusted under 35 U.S.C. 154(b) by 85 days.

(21) Appl. No.: 18/192,516

(22) Filed: Mar. 29, 2023

(65) Prior Publication Data

US 2023/0236694 A1    Jul. 27, 2023

(30) Foreign Application Priority Data

Dec. 2, 2022   (CN) .......................... 202211540064.1

(51) Int. Cl.
  *G06F 3/041*   (2006.01)
  *G06F 3/044*   (2006.01)

(52) U.S. Cl.
  CPC ........ *G06F 3/04164* (2019.05); *G06F 3/0412* (2013.01); *G06F 3/0443* (2019.05); *G06F 3/0445* (2019.05); *G06F 3/0446* (2019.05); *G06F 2203/04103* (2013.01); *G06F 2203/04111* (2013.01)

(58) Field of Classification Search
  CPC .. G06F 3/0412; G06F 3/04164; G06F 3/0443; G06F 3/0445; G06F 3/0446; G06F 2203/04103; G06F 2203/04111
  USPC ........................................................ 345/173
  See application file for complete search history.

(56) References Cited

U.S. PATENT DOCUMENTS

| | | | |
|---|---|---|---|
| 9,965,087 B2* | 5/2018 | Xie ..................... | G06F 3/0412 |
| 10,108,039 B2* | 10/2018 | Xie ..................... | G06F 3/0412 |
| 11,803,275 B2* | 10/2023 | Jeong .................. | G06F 3/044 |
| 2016/0327835 A1* | 11/2016 | Xie ..................... | G06F 3/0443 |
| 2016/0364069 A1* | 12/2016 | Tsai .................... | G06F 3/0412 |
| 2018/0231819 A1* | 8/2018 | Xie ..................... | G06F 3/0412 |
| 2019/0302557 A1* | 10/2019 | Obinata ............. | G02F 1/136286 |
| 2020/0348772 A1* | 11/2020 | Chen .................. | G06F 3/041 |

FOREIGN PATENT DOCUMENTS

| | | |
|---|---|---|
| CN | 203882052 U | 10/2014 |
| CN | 104793386 A | 7/2015 |

* cited by examiner

*Primary Examiner* — Jason M Mandeville
(74) *Attorney, Agent, or Firm* — Christensen O'Connor Johnson Kindness PLLC

(57) ABSTRACT

Provided are an array substrate, a display panel, and a display device. The array substrate includes a substrate, and touch electrodes and touch leads located at a side of the substrate. The touch lead extends along a first direction. The touch electrode includes a groove and a first portion that are arranged along the first direction. The touch electrodes include a first touch electrode. The touch leads include a first touch lead including a first line segment and a second line segment. A line width of the first line segment is smaller than a line width of the second line segment. Along a direction perpendicular to a plane of the substrate, the first touch lead overlaps the first touch electrode, the first line segment at least partially overlaps the first portion, and the second line segment at least partially overlaps the groove.

23 Claims, 17 Drawing Sheets

ARRAY SUBSTRATE, DISPLAY PANEL, AND DISPLAY DEVICE

CROSS-REFERENCE TO RELATED APPLICATIONS

The present application claims priority to Chinese Patent Application No. 202211540064.1, filed on Dec. 2, 2022, the content of which is incorporated herein by reference in its entirety.

TECHNICAL FIELD

The present disclosure relates to the technical field of display, and in particular, to an array substrate, a display panel, and a display device.

BACKGROUND

Touch function realizes interactions between a user and an electronic product, and is an important function in current electronic products. In the touch scheme, an electrical signal generated by the user's touch operation to the display product is detected and processed by a system, and then the system controls the display product according to the process result to realize the touch operation. The display panel is provided with touch electrodes and touch leads. A touch detection signal is transmitted through the touch lead. The load of the touch lead may cause a voltage drop of the touch detection signal, affecting the magnitude of touch detection signal and further affecting the accuracy and precision of touch detection.

SUMMARY

In a first aspect, some embodiments of the present disclosure provide an array substrate. The array substrate includes a substrate, a plurality of touch electrodes, and a plurality of touch leads. The plurality of touch electrodes and the plurality of touch leads are located at a side of the substrate, and the plurality of touch leads each extends along a first direction. One touch electrode of the plurality of touch electrodes includes at least one groove and at least one first portion, one groove of the at least one groove and one first portion of the at least one first portion are arranged along the first direction, and the plurality of touch electrodes includes a first touch electrode. The plurality of touch leads includes a first touch lead that includes a first line segment and a second line segment, and a line width of the first line segment is smaller than a line width of the second line segment. Along a direction perpendicular to a plane of the substrate, the first touch lead overlaps the first touch electrode, the first line segment at least partially overlaps the first portion, and the second line segment at least partially overlaps the groove.

In a second aspect, some embodiments of the present disclosure provide a display panel including an array substrate. The array substrate includes a substrate, a plurality of touch electrodes, and a plurality of touch leads. The plurality of touch electrodes and the plurality of touch leads are located at a side of the substrate, and the plurality of touch leads each extends along a first direction. One touch electrode of the plurality of touch electrodes includes at least one groove and at least one first portion, one groove of the at least one groove and one first portion of the at least one first portion are arranged along the first direction, and the plurality of touch electrodes includes a first touch electrode. The plurality of touch leads includes a first touch lead that includes a first line segment and a second line segment, and a line width of the first line segment is smaller than a line width of the second line segment. Along a direction perpendicular to a plane of the substrate, the first touch lead overlaps the first touch electrode, the first line segment at least partially overlaps the first portion, and the second line segment at least partially overlaps the groove.

In a third aspect, some embodiments of the present disclosure provide a display device. The display device includes a display panel including an array substrate. The array substrate includes a substrate, a plurality of touch electrodes, and a plurality of touch leads.

The plurality of touch electrodes and the plurality of touch leads are located at a side of the substrate, and the plurality of touch leads each extends along a first direction. One touch electrode of the plurality of touch electrodes includes at least one groove and at least one first portion, one groove of the at least one groove and one first portion of the at least one first portion are arranged along the first direction, and the plurality of touch electrodes includes a first touch electrode. The plurality of touch leads includes a first touch lead that includes a first line segment and a second line segment, and a line width of the first line segment is smaller than a line width of the second line segment. Along a direction perpendicular to a plane of the substrate, the first touch lead overlaps the first touch electrode, the first line segment at least partially overlaps the first portion, and the second line segment at least partially overlaps the groove.

BRIEF DESCRIPTION OF DRAWINGS

In order to more clearly illustrate the technical solutions in the embodiments of the present disclosure, the accompanying drawings used in the description of the embodiments will be introduced below. The accompanying drawings in the following description are only some embodiments of the present disclosure, and other drawings can be obtained by those of ordinary skill in the art from the provided drawings.

DESCRIPTION OF EMBODIMENTS

In order to better understand the technical solutions of the present disclosure, the embodiments of the present disclosure will be described in detail below with reference to the accompanying drawings. It should be clear that the described embodiments are merely some of rather than all of the embodiments of the present disclosure. All other embodiments acquired by those of ordinary skill in the art based on the embodiments in the present disclosure fall within the scope of the present disclosure.

The terms used in the embodiments of the present disclosure are for the purpose of describing particular embodiments only, and are not intended to limit the present disclosure. As used in the embodiments of the present disclosure and the appended claims, the singular forms of "a/an", "the", and "said" are intended to include plural forms, unless otherwise clearly specified in the context.

In the related art, a display panel includes a plurality of patterned touch electrodes and a plurality of touch leads. Each touch electrode is electrically connected to at least one touch lead. In addition to the touch lead that is electrically connected to the touch electrode, the touch electrode also overlaps the touch lead that is not electrically connected to the touch electrode. When the touch electrode and the touch lead are overlapped with each other, but not electrically connected to each other, a coupling capacitance is formed between the touch electrode and the touch lead. The touch electrode is connected to a bonding end of the display panel through the touch lead. The longer the touch lead is, the greater the resistance of the touch lead is. The resistance and load (such as the coupling capacitance) of the touch lead may cause a voltage drop of a signal transmitted on the touch lead. In the related art, the resistance of the touch lead is typically reduced by increasing the line width of the touch lead. However, increasing the width of the touch lead causes a larger overlapping area between the touch lead and the touch electrode and thus causes a greater coupling capacitance between the touch lead and the touch electrode, which is conductive to touch detection.

In view of the above, embodiments of the present disclosure provide an array substrate. The configuration of the touch lead in the array substrate is optimized to reduce the coupling capacitance between the touch lead and the touch electrode and reduce the influence of the load of the touch lead to the magnitude of the touch detection signal, thereby improving the precision and accuracy of the touch detection.

Figure 1:
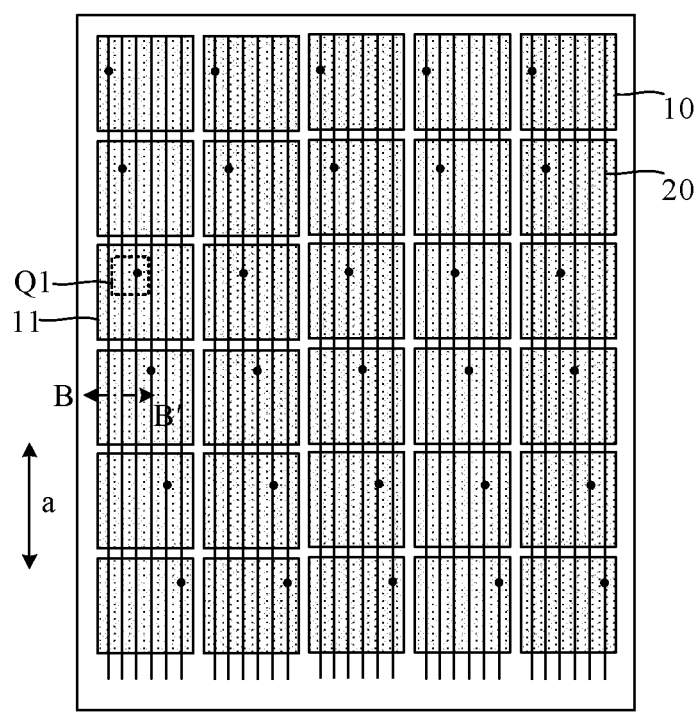
FIG. 1 is a schematic diagram of an array substrate according to embodiments of the present disclosure.
Figure 2:
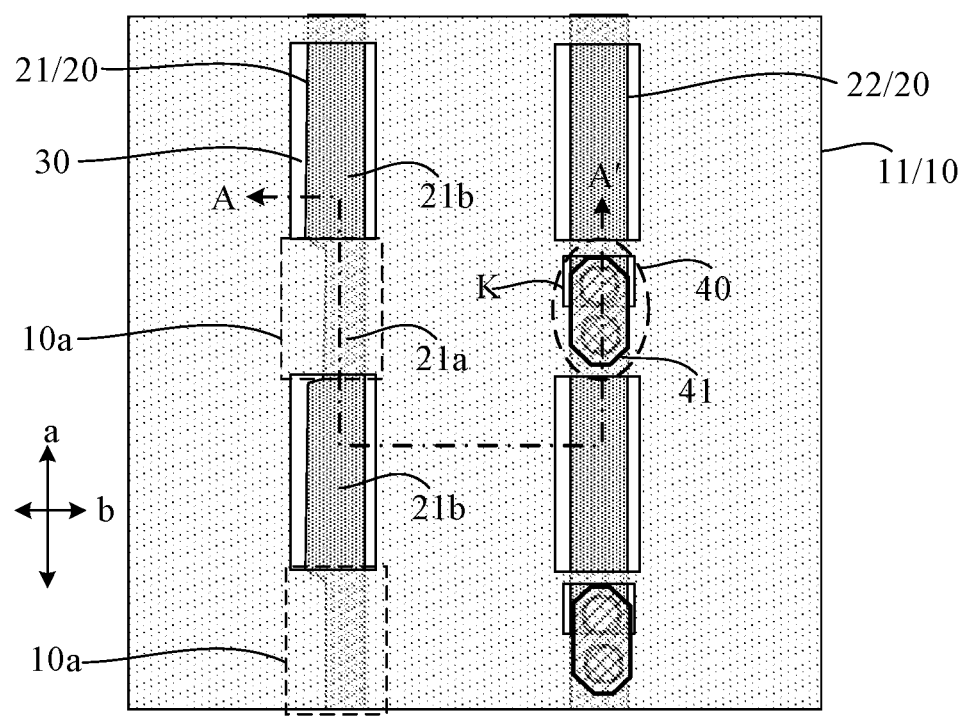
FIG. 2 is an enlarged schematic view illustrating an area Q1 of FIG. 1.
Figure 3:
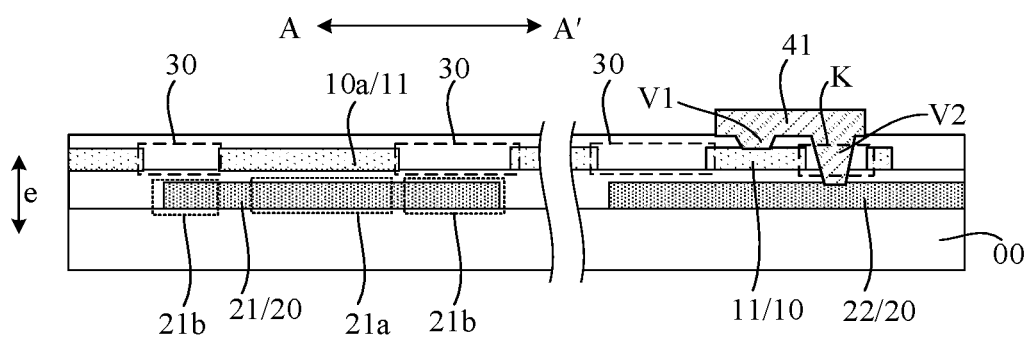
FIG. 3 is a schematic cross-sectional view along line A-A' of FIG. 2.

FIG. 1 is a schematic diagram of an array substrate according to embodiments of the present disclosure. FIG. 2 is an enlarged schematic view illustrating an area Q1 of FIG. 1. FIG. 3 is a schematic cross-sectional view along line A-A' of FIG. 2.

As shown in FIG. 1, an array substrate includes a substrate 00, a plurality of touch electrodes 10, and a plurality of touch leads 20. The plurality of touch electrodes 10 and the plurality of touch leads 20 are located at a side of the substrate. The touch electrode 10 is electrically connected to at least one touch lead 20. During a touch detection phase, the touch lead 20 is configured to transmit a touch detection signal. The touch lead 20 extends along a first direction a. The touch electrodes 10 include a first touch electrode 11. In some embodiments, the touch electrodes 10 are arranged in rows and columns to form a matrix illustrated in FIG. 1.

FIG. 2 illustrates area region of the first touch electrode 11 and two touch leads 20. As shown in FIG. 2, the touch electrode 10 includes a groove 30 and a first portion 10a. The first portion 10a and the groove 30 are arranged along the first direction a. The groove 30 penetrates the touch electrode 10 along a thickness direction of the touch electrode 10. The plurality of touch leads 20 includes a first touch lead 21. The first touch lead 21 includes a first line segment 21a and a second line segment 21b. As shown in FIG. 3, along a direction e perpendicular to a plane of the substrate 00, the first line segment 21a at least partially overlaps the first portion 10a, and the second line segment 21b at least partially overlaps the groove 30. A line width of the first line segment 21a is smaller than a line width of the second line segment 21b. The line width of the line segment of the first touch lead 21 refers to a width of the line segment in a direction perpendicular to the first direction a. FIG. 2 illustrates an example in which the touch lead 20 is a shape of a straight line. In some embodiments, a part of the touch electrode 20 can be in a shape of a broken line, but the touch lead 20 overall extends along the first direction a.

The groove 30 is equivalent to a hollow part of the touch electrode 10. In other words, a partial region of the touch electrode 10 is hollowed out to form the groove 30. The groove 30 is a non-physical structure of the touch electrode 10, and the first portion 10a is a physical structure of the touch electrode 10. The second line segment 21b of the first touch lead 21 overlaps the groove 30. That is, the second line segment 21b overlaps the non-physical structure of the first touch electrode 11, and no coupling capacitance is generated by the overlapping between the second line segment 21b and the groove 30, and thus the load of the first touch lead 21 is not increased. The first line segment 21a of the first touch lead 21 overlaps the first portion 10a, and thus a coupling capacitance is generated between the first line segment 21a and the first portion 10a, which affects the load of the first touch lead 21.

In the embodiments of the present disclosure, the first touch lead 21 is designed to have different line widths in different line segments. Line segments of the first touch lead 21 that overlap different regions of the first touch electrode 11 have different line widths. The first line segment 21a overlaps the first portion 10a of the first touch electrode 11, the second line segment 21b overlaps the groove 30 of the first touch electrode 11, and the line width of the first line segment 21a is smaller than a line width of the second line segment 21b. That is, the line width of the first line segment 21a overlapping the first portion 10a may be set small, and the line width of the second line segment 21b overlapping the groove 30 may be set large. Due to the configuration of the groove 30, there is no coupling capacitance formed between the second line segment 21b and the first touch electrode 11. Since the line width of the first line segment 21a is reduced, the coupling capacitance between the first line segment 21a and the first portion 10a is reduced. In this way, the load of the first touch lead 21 can be reduced, the influence of the load of the touch lead on the magnitude of the touch detection signal is reduced, and the precision and accuracy of the touch detection are improved.

In some embodiments, the first touch lead 21 has a target line width. When the line width of the first touch lead 21 is the target line width, the resistance of the first touch lead 21 is within a reasonable range and satisfies the target requirement. In embodiments of the present disclosure, the line width of the first line segment 21a is smaller than the line width of the second line segment 21b. In some embodiments, the line width of the first line segment 21a is smaller than the target line width, and the line width of the second line segment 21b is greater than the target line width. That is, compared with the target line width, the line width of the first line segment 21a is reduced, while the line width of the second line segment 21b is increased. The coupling capacitance formed by overlapping between the first line segment 21a and the first touch electrode 11 is reduced by reducing the line width of the first line segment 21a. The reduction of the line width of the first line segment 21a increases the resistance of the first line segment 21a. Reduction of the line width of the first line segment 21a on the overall resistance of the first touch lead 21 is compensated by increasing the line width of the second line segment 21b. In this way, the coupling capacitance between the first touch lead 21 and the first touch electrode 11 is reduced without increasing the resistance of the first touch lead 21, and thus the load of the touch lead is reduced, thereby reducing the load of the touch lead on the magnitude of the touch detection signal and improving the accuracy and precision of touch detection.

In some embodiments, as shown in FIG. 2, a second direction b intersects the first direction a. For example, the second direction b is perpendicular to the first direction a. The line width of the second line segment 21b is the width of the second line segment 21b in the second direction b. The width of the groove 30 in the second direction b is greater than the line width of the second line segment 21b. With such configuration, the second line segment 21b is exposed by the groove 30, and the second line segment 21b and the physical structure of the touch electrode 10 do not overlap each other.

In some embodiments, the touch electrode 10 includes multiple grooves 30. Along an extending direction of one touch lead 20, the touch lead 20 overlaps multiple grooves 30 of one touch electrode 10. The groove 30 is provided to reduce an overlapping area between the touch lead 20 and the touch electrode 10, and thus the coupling capacitance between the touch lead 20 and the touch electrode 10 is reduced.

Figure 4:
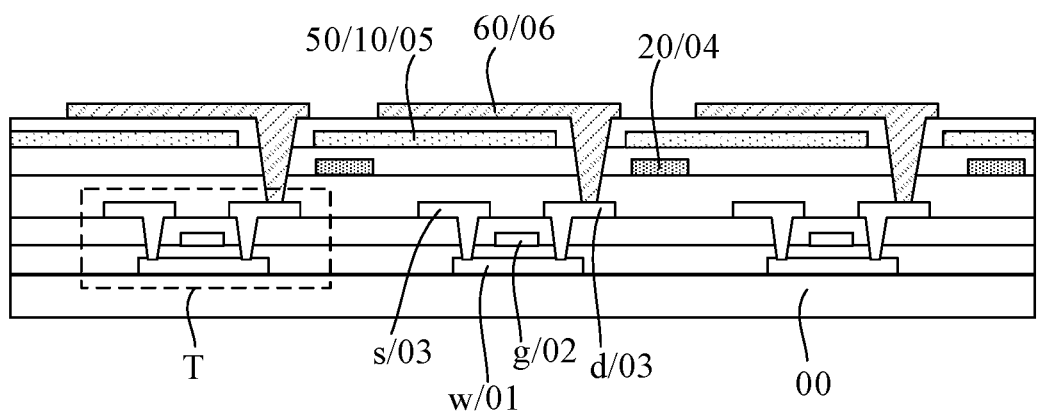
FIG. 4 is a schematic cross-sectional view along line B-B' of FIG. 1.

FIG. 4 is a schematic cross-sectional view along line B-B' of FIG. 1. FIG. 4 shows the layers of the array substrate. In some embodiments, as shown in FIG. 4, the array substrate includes a substrate 00, a semiconductor layer 01, a first metal layer 02, a second metal layer 03, a third metal layer 04, a first transparent conductive layer 05, and a second transparent conductive layer 06. The semiconductor layer 01, the first metal layer 02, the second metal layer 03, the third metal layer 04, the first transparent conductive layer 05, and the second transparent conductive layer 06 are located at a same side of the substrate 00. The array substrate includes a switch transistor T, a common electrode 50, and a pixel electrode 60. The switch transistor T is a pixel switch, and the pixel electrode 60 is connected to the switch transistor T. The switch transistor T includes an active layer w located in the semiconductor layer 01, a gate g located in the first metal layer 02, and a source s and a drain d that are located in the second metal layer 03. The touch lead 20 is located in the third metal layer 04. The common electrode 50 is located in the first transparent conductive layer 05. The pixel electrode 60 is located in the second transparent conductive layer 06. The array substrate includes a gate line and a data line. The gate g of the switch transistor T is electrically connected to the gate line. The source s of the switch transistor T is electrically connected to the data line. The gate line is located in the first metal layer 02. The data line is located in the second metal layer 03. In the embodiments, the common electrode 50 is reused as the touch electrode 10. After the array substrate is assembled to a display panel, during a display phase, the common electrode 50 and the touch electrode 10 operate together to generate an electric field that drives the liquid crystal molecules to rotate, and during a touch phase, the touch electrode 10 and the touch lead 20 operate together to transmit the touch detection signal.

In some embodiments, the first transparent conductive layer 05 and the second transparent conductive layer 06 are made of a same material. The material of the first transparent conductive layer 05 and the second transparent conductive layer 06 includes metal oxide, and the metal oxide includes indium tin oxide, zinc indium oxide, zinc oxide, indium oxide, and the like.

In some embodiments, the array substrate includes a bridge structure configured to electrically connect the touch lead 20 and the touch electrode 10. As shown in FIG. 2 and FIG. 3, the bridge structure 40 and the groove 30 are adjacent to each other along the first direction a. The bridge structure 40 includes a pad block 41. A first end of the pad block 41 is connected to the first portion 10a through a first via V1, and a second end of the pad block 41 is connected to a second touch lead 22 through a second via V2. The touch lead 20 includes a second touch lead 22, and the touch electrode 10 includes an opening K. The second via V2 penetrates the touch electrode 10 at the opening K and is connected to the second touch lead 22 below the touch electrode 11. The bridge structure 40 realizes the electrical connection between the second touch lead 22 and the first touch electrode 11. During the touch phase, the second touch lead 22 is configured to transmit the touch detection signal of the first touch electrode 11. As shown in FIG. 3, the touch lead 20, the touch electrode 10, and the pad block 41 are located in three layers of the substrate 00, respectively. In some embodiments, the pad block 41 is located in the second transparent conductive layer 06.

In the embodiments shown in FIG. 2, the first touch lead 21 and the first touch electrode 11 are overlapped with each other and insulated from each other, the second touch lead 22 and the first touch electrode 11 are overlapped with each other and electrically connected through the bridge structure 40. However, it should be understood that the terms "first touch lead 21" and "second touch lead 22" do not limit their electrical connection to the touch electrode 10.

In some embodiments, the array substrate includes a dummy bridge structure. The dummy bridge structure may be understood based on the bridge structure shown in FIG. 2. The touch electrode 10 may overlap the touch lead 20 that is connected to the touch electrode 10, and overlap another touch lead 20 that is not connected to the touch electrode 10. In the embodiments shown in FIG. 2, the electrical connection between the touch electrode 10 and the touch lead 20 is realized by the bridge structure 40. The dummy bridge structure may be regarded as a structure that cannot realize the electrical connection between the touch electrode 10 and the touch lead 20. Compared with the bridge structure 40, the dummy bridge structure does not include the pad block 41, or the dummy bridge structure does not include the first via V1 or the second via V2, or the touch electrode 10 does not include the opening K at the dummy bridge structure such that the pad block 41 cannot be connected to the touch lead 20. Examples of the dummy bridge structure are described in the following embodiments.

Figure 5:
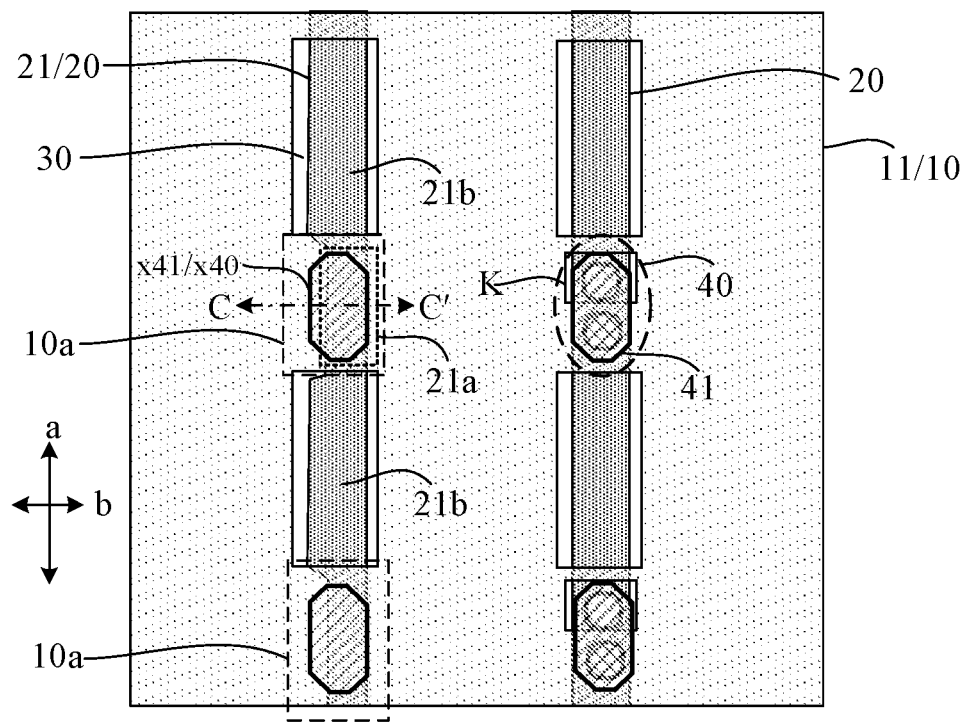
FIG. 5 is another enlarged schematic view illustrating the area Q1 of FIG. 1.
Figure 6:
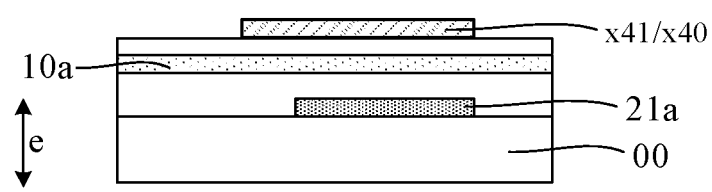
FIG. 6 is a schematic cross-sectional view along line C-C' of FIG. 1.

FIG. 5 is another enlarged schematic view illustrating the area Q1 of FIG. 1. FIG. 6 is a schematic cross-sectional view along line C-C' of FIG. 1. As shown in FIG. 5 and FIG. 6, the dummy bridge structure x40 is adjacent to the groove 30 along the first direction a. Along the direction e that is perpendicular to the plane of the substrate 00, the first line segment 21a at least partially overlaps the dummy bridge structure x40. The line width of the first line segment 21a is smaller than the line width of the second line segment 21b. In the embodiments, the line width of the first touch lead 21 in the region corresponding to the dummy bridge structure x40 is reduced, and thus the coupling capacitance between the first touch lead 21 and the first touch electrode 11 is reduced, thereby reducing the load of the first touch lead 21. When the first touch lead 21 has a target line width, the line width of the first line segment 21a is smaller than the target line width, and the line width of the second line segment 21b is greater than the target line width. The coupling capacitance between the first touch lead 21 and the first touch electrode 11 is reduced by reducing the line width of the first line segment 21a, and the reduction of the line width of the first line segment 21a on the overall resistance of the first touch lead 21 is compensated by increasing the line width of the second line segment 21b. In this way, the coupling capacitance between the first touch lead 21 and the first touch electrode 11 is reduced without increasing the resistance of the first touch lead 21, and thus the load of the touch lead is reduced, thereby reducing the load of the touch lead on the magnitude of the touch detection signal and improving the accuracy and precision of touch detection.

In some embodiments, as shown in FIG. 6, the dummy bridge structure x40 includes a dummy pad block 41. Along the direction e that is perpendicular to the plane of the substrate 00, the dummy pad block x41 at least partially overlaps the first line segment 21a, and the dummy pad block x41 at least partially overlaps the first portion 10a. The dummy pad block x41 and the pad block 41 may be formed in a same process step. With the dummy pad block x41, the etch uniformity of the etch process of the pad block 41 is ensured, and the fabricating precision of the pad block 41 is ensured.

Figure 7:
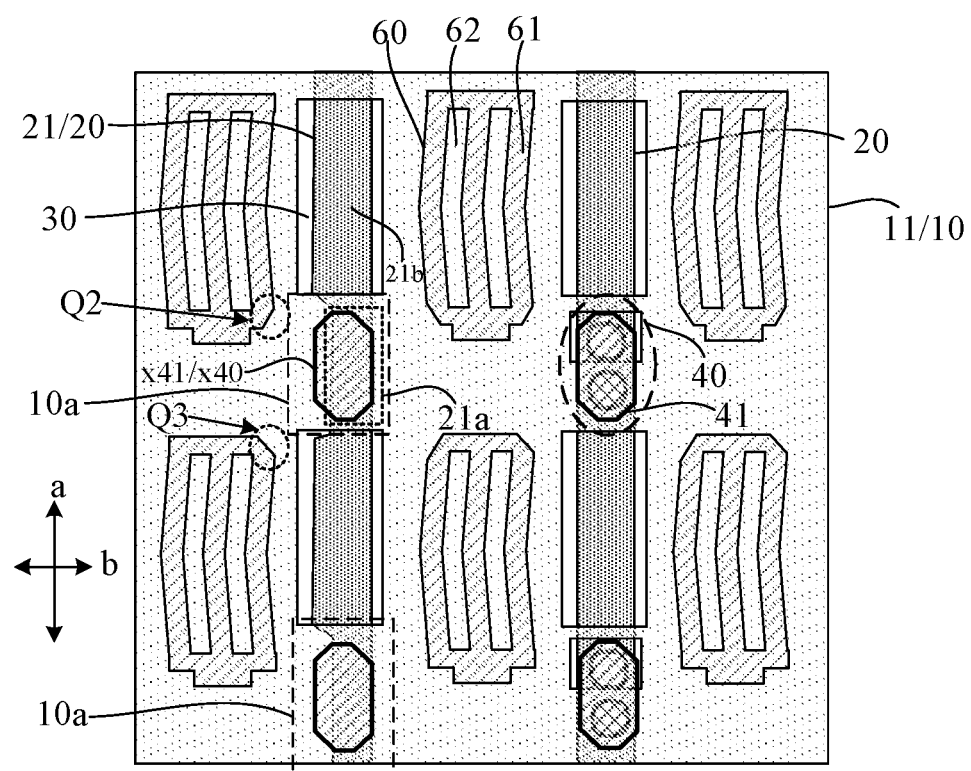
FIG. 7 is another enlarged schematic view illustrating the area Q1 of FIG. 1.

FIG. 7 is another enlarged schematic view illustrating the area Q1 of FIG. 1. In some embodiments, as shown in FIG. 7, the array substrate includes multiple pixel electrodes 60. The dummy pad block x41 and the pixel electrodes 60 are located in the same layer. In conjunction with the layers shown in FIG. 4, the dummy pad block x41 and the pixel electrodes 60 are located in the second transparent conductive layer 06. As shown in areas Q2 and Q3, the pixel electrode 60 has a chamfer adjacent to the dummy pad block x41. The chamfer can be understood as a structure formed by cutting a part of a corner of the pixel electrode 60. Such configuration can ensure a safe distance between the dummy pad block x41 and the pixel electrode 60 when the dummy pad block x41 and the pixel electrode 60 are formed in the same layer, so as to avoid the short circuit between the dummy pad block x41 and the pixel electrode 60.

In some embodiments, as shown in FIG. 7, the pixel electrode 60 includes an electrode strip 61 and a slit 62. The slit 62 is located between adjacent electrode strips 61. FIG. 7 shows an example shape of the pixel electrode 60, and the shape of the pixel electrode 60 is not limited thereto.

Figure 8:
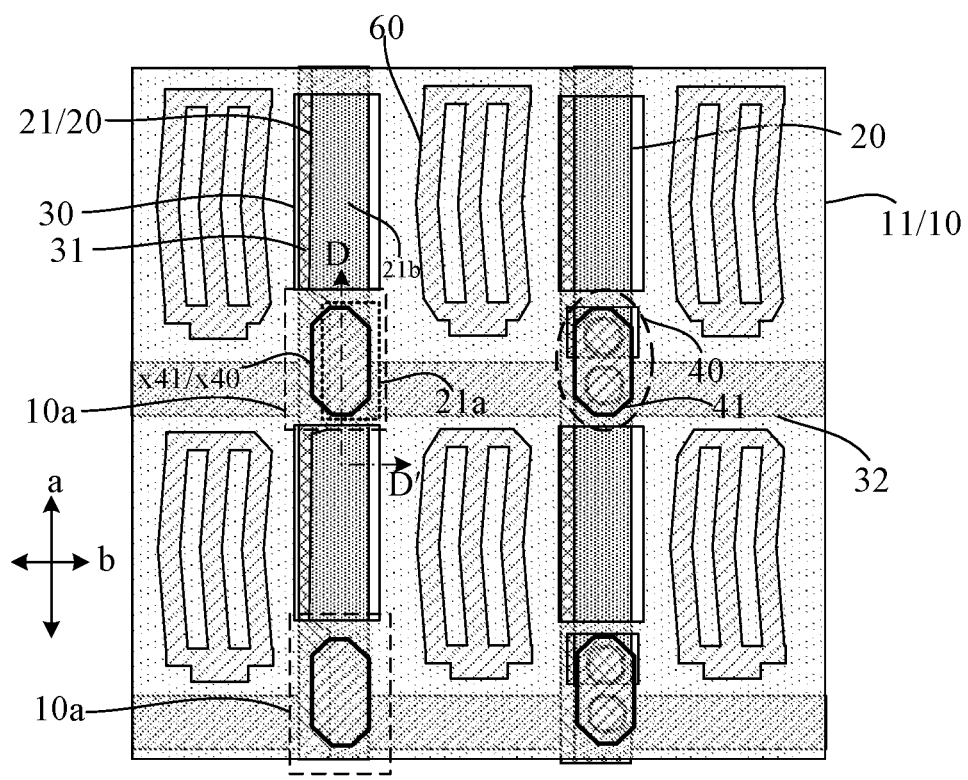
FIG. 8 is another enlarged schematic view illustrating the area Q1 of FIG. 1.

FIG. 8 is another enlarged schematic view illustrating the area Q1 of FIG. 1. In some embodiments, as shown in FIG. 8, the array substrate includes data lines 31 and gate lines 32. The data line 31 extends along the first direction a. The data line 31 extends in a same direction as the touch lead 20. The gate line 32 extends along the second direction b. The data lines 31 are insulated from the gate lines 32 and cross the gate lines 32 to define multiple pixel areas. The pixel electrodes 60 each are located in one of the pixel areas. It can be understood that, from a top view of the array substrate, some pixel electrodes 60 are arranged in an electrode column along the first direction a, and some pixel electrodes 60 are arranged in an electrode row along the second direction b. The dummy pad block x41 is approximately located at a position where the data line 31 and the gate line 32 intersect. The length of the dummy pad block x41 along the first direction a is greater than the length of the dummy pad block x41 along the second direction b. The dummy pad block x41 is approximately a long bar. With such configuration, the length of the dummy pad block x41 along the second direction b can be reduced, avoiding the short circuit between the dummy pad block x41 and the pixel electrode 60 due to a too small distance between the dummy pad block x41 and the pixel electrode 60 along the second direction b.

As shown in FIG. 8, the dummy pad block x41 and the pad block 41 have a same shape. That is, the length of the pad block 41 along the first direction a is greater than the length of the pad block 41 along the second direction b.

Figure 9:
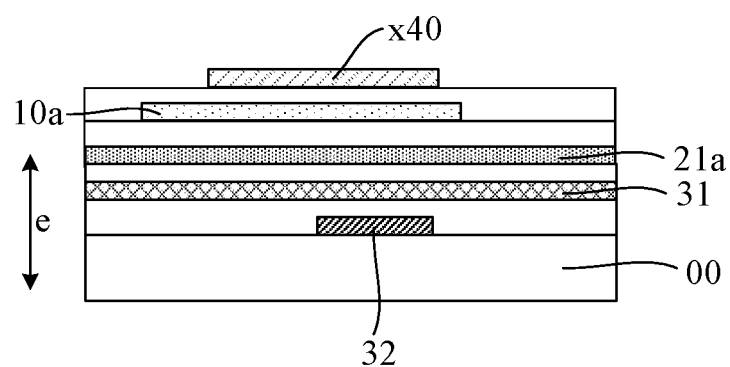
FIG. 9 is a schematic cross-sectional view along line D-D' of FIG. 8.

FIG. 9 is a schematic cross-sectional view along line D-D' of FIG. 8. In some embodiments, as shown in FIG. 9, the data line 31 and the touch lead 20 are located in different layers. The data line 31 is located in the second metal layer 03, and the touch lead 20 is located in the third metal layer 04. Along the direction e perpendicular to the plane of the substrate 00, the touch lead 20 at least partially overlaps the data line 31. In the present embodiment, the touch lead 20 at least partially overlaps the data line 31, which reduces the total width, along the second direction b, of the touch lead 20 and the data line 31 that are located between pixel electrodes 60 adjacent to each other along the second direction b. In applications, the array substrate and an opposite substrate are assembled to form a display panel, the light-shielding strips (also referred to as a black matrix) of the opposite substrate can be used to shield metal lines (such as touch leads and data lines), to prevent the metal lines from reflecting the ambient light to avoid affecting the display effect. With the configuration of the embodiments, widths of the light-shielding strips for shielding the touch lead 20 and the data line 31 can be reduced, thereby improving the aperture ratio of the display panel.

Figure 10:
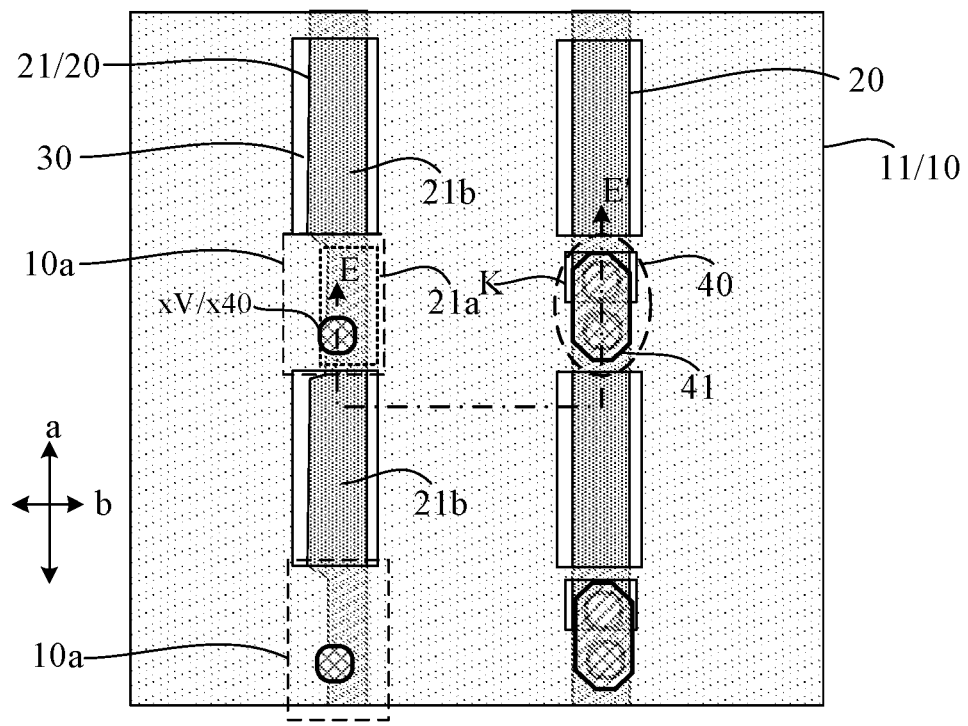
FIG. 10 is another enlarged schematic view illustrating the area Q1 of FIG. 1.
Figure 11:
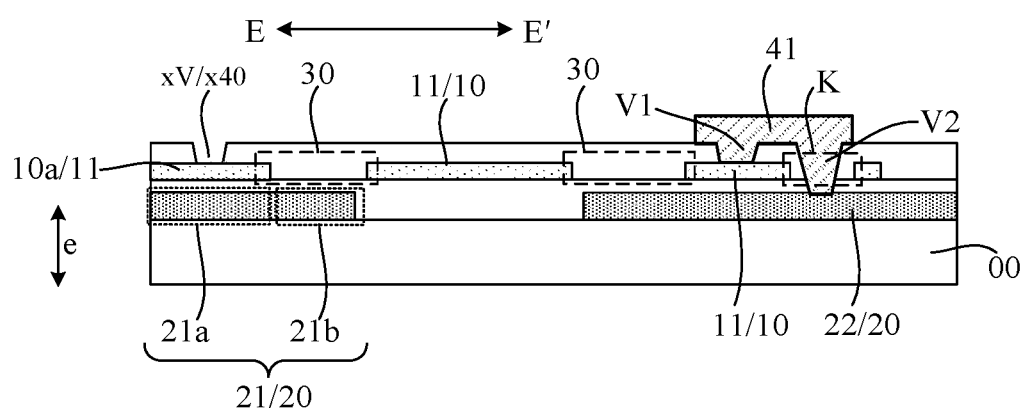
FIG. 11 is a schematic cross-sectional view along line E-E' of FIG. 10.

In some embodiments, the dummy bridge structure x40 includes at least one dummy via. FIG. 10 is another enlarged schematic view illustrating the area Q1 of FIG. 1. FIG. 11 is a schematic cross-sectional view along line E-E' of FIG. 10. As shown in FIG. 10 and FIG. 11, the dummy bridge structure x40 includes a dummy via xV. Along the direction e perpendicular to the plane of the substrate 00, the first segment 21a overlaps the dummy via xV, and the dummy via xV overlaps the first portion 10a. With respect to the bridge structure 40, the dummy via xV corresponds to the first via V1 of the bridge structure 40. The dummy via xV, and the first via V1 and the second via V2 of the bridge structure 40 are formed in a same hole-forming step of an insulation layer. In the embodiments, the line width of the first touch lead 21 in the region of the dummy bridge structure x40 is reduced, and thus the coupling capacitance between the first touch lead 21 and the first touch electrode 11 is reduced, thereby reducing the load of the first touch lead 21.

In some other embodiments, the first touch lead 21 has a target line width, and the line width of the first line segment 21a is smaller than the line width of the second line segment 21b. For example, the line width of the first line segment 21a is smaller than the target line width, and the line width of the second line segment 21b is greater than the target line width. The coupling capacitance between the first touch lead 21 and the first touch electrode 11 is reduced by reducing the line width of the first line segment 21a. The reduction of the line width of the first line segment 21a increases the resistance of the first line segment 21a. The effect of the reduction of the line width of the first line segment 21a on the overall resistance of the first touch lead 21 is compensated by increasing the line width of the second line segment 21b. In this way, the coupling capacitance between the first touch lead 21 and the first touch electrode 11 is reduced without increasing the resistance of the first touch lead 21, and thus the load of the touch lead is reduced, thereby reducing the load of the touch lead on the magnitude of the touch detection signal and improving the accuracy and precision of touch detection.

In the embodiment shown in FIG. 10, the dummy bridge structure x40 includes a dummy via xV. In another embodiment not shown in the figure, the dummy bridge structure x40 includes two dummy vias xV arranged along the first direction a and corresponding to the first via V1 and the second via V2, respectively.

In some embodiments, the dummy via xV is filled with an insulation material.

Figure 12:
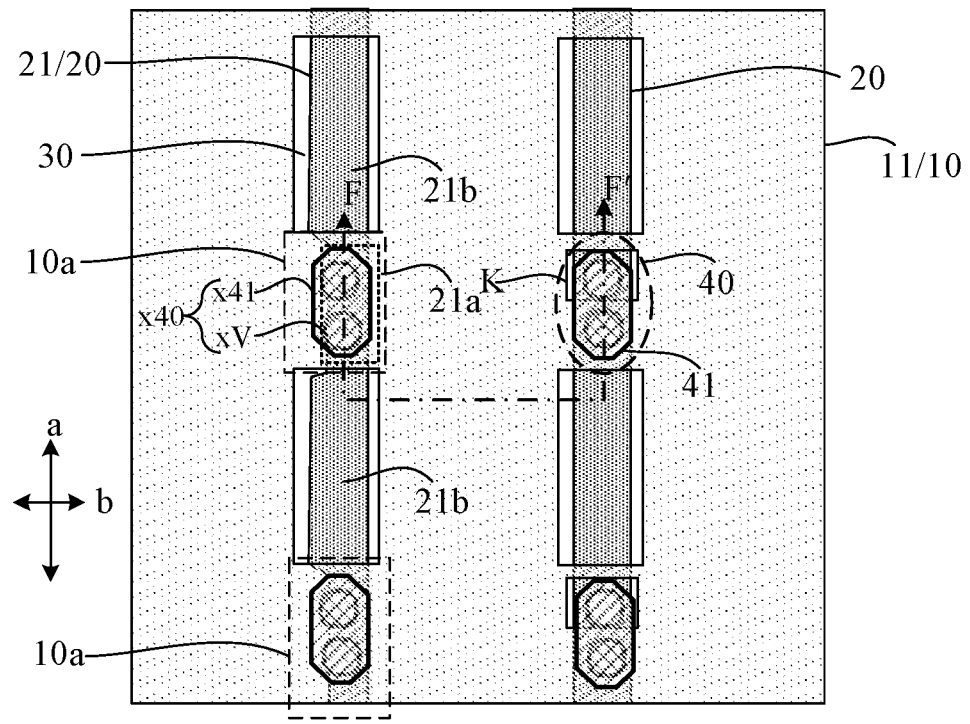
FIG. 12 is another enlarged schematic view illustrating the area Q1 of FIG. 1.
Figure 13:
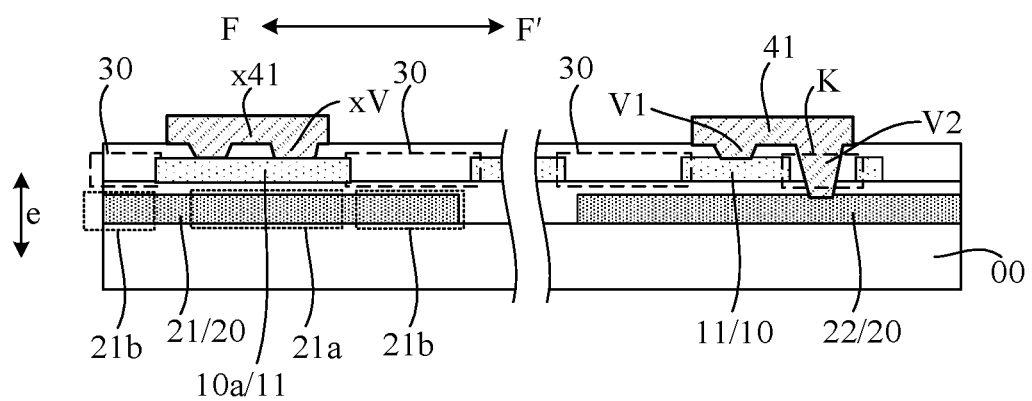
FIG. 13 is a schematic cross-sectional view along line F-F' of FIG. 12.

FIG. 12 is another enlarged schematic view illustrating the area Q1 of FIG. 1. FIG. 13 is a schematic cross-sectional view along line F-F' of FIG. 12. In some other embodiments, as shown in FIG. 12 and FIG. 13, the dummy bridge structure x40 includes a dummy pad block x41 and two dummy vias xV. The dummy pad block x41 is connected to the first portion 10a through the dummy via xV. Compared with the position of the bridge structure 40, the first portion 10a does not have an opening K at the position of the dummy bridge structure x40, so the dummy via xV cannot be connected to the first touch lead 21 below the first touch lead 11. In this way, the dummy bridge structure x40 does not electrically connect the first touch lead 21 and the first touch electrode 11.

In some other embodiments, the dummy bridge structure x40 includes a dummy pad block x41 and one dummy via xV. The dummy pad block x41 is connected to the first touch electrode 11 through the dummy via xV. The dummy via xV corresponds to the position of the first via V1 of the bridge structure 40.

In some other embodiments, the dummy bridge structure x40 includes a dummy pad block x41 and one dummy via xV. The dummy pad block x41 is connected to the first touch electrode 11 through the dummy via xV. The dummy via xV corresponds to the position of the second via V2 of the bridge structure 40.

Figure 14:
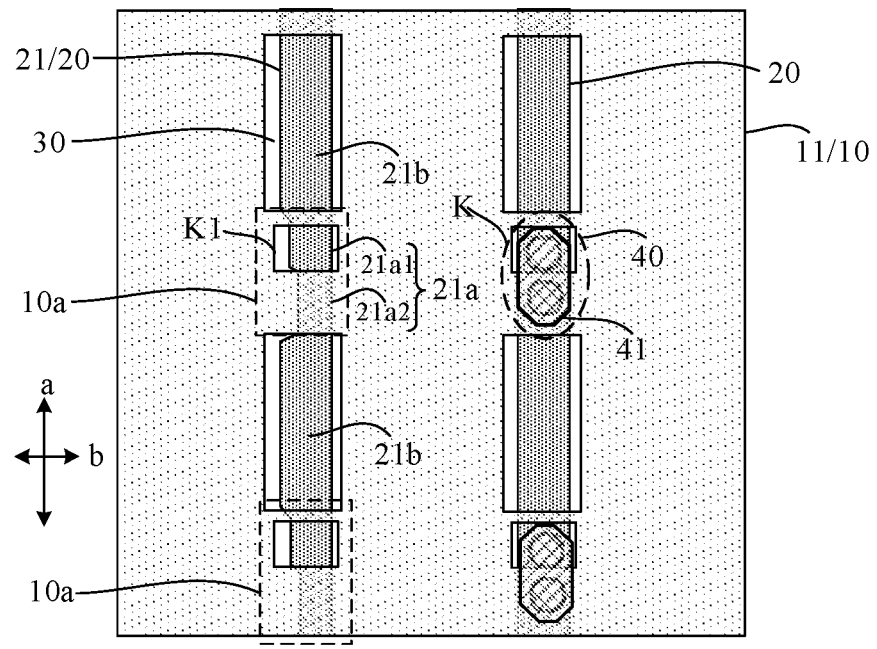
FIG. 14 is another enlarged schematic view illustrating the area Q1 of FIG. 1.

FIG. 14 is another enlarged schematic view illustrating the area Q1 of FIG. 1. In some other embodiments, the first line segment 21a includes a first sub-segment 21a1 and a second sub-segment 21a2, and a line width of the first sub-segment 21a1 is greater than a line width of the second sub-segment 21a2. As shown in the top view of FIG. 14, along the direction perpendicular to the plane of the substrate 00, at least the second sub-segment 21a2 overlaps the first portion 10a. In the embodiments, the sub-segments of the first touch lead 21 are designed to have different line widths. The first line segment 21a includes the first sub-segment 21a1 and the second sub-segment 21a2 that have different line widths. The first sub-segment 21a1 having a larger line width compensates the reduction of the resistance of the first line segment 21a, avoiding that the line width of the first line segment 21a is too small and the reduction of the overall resistance of the first touch lead 21 is too large. The second sub-segment 21a2 having a smaller line width overlaps the first portion 10a, such that the coupling capacitance between the first touch lead 21 and the first touch lead 11 is reduced. The line width of the second line segment 21b is greater than the line width of the first line segment 21a. If the first touch lead 21 has a target line width, the line width of the first line segment 21a is smaller than the target line width, and the line width of the second line segment 21b is greater than the target line width. The reduction of the line width of the first line segment 21a on the resistance of the first touch lead 21 is compensated by increasing the line width of the second line segment 21b. In this way, the coupling capacitance between the first touch lead 21 and the first touch electrode 11 is reduced without increasing the resistance of the first touch lead 21, thereby reducing the load of the first touch lead 21.

In some embodiments, as shown in FIG. 14, the first portion 10a has a first opening K1. Along the direction perpendicular to the plane of the substrate 00, the first opening K1 overlaps the first sub-segment 21a1. The first opening K1 is a non-physical structure of the first touch electrode 11. Therefore, the overlapping between the first opening K1 and the first sub-segment 21a1 having a larger line width does not increase the coupling capacitance between the first touch electrode 11 and the first touch lead 21. The first sub-segment 21a1 having a larger line width does not increase the coupling capacitance between the first touch electrode 11 and the first touch lead 21. The reduction of the resistance of the first line segment 21a is compensated by the first sub-segment 21a1 having a larger line width. It is avoided that the line width of the first line segment 21a is too small, and the overall resistance of the first touch lead 21 is too large. Accordingly, it is avoided that the line width of the second line segment 21b is designed to large. In this way, when the array substrate and the counter substrate are assembled to form a display panel, the aperture ratio of the display panel is not affected. The reason is as follows. The reduction of the resistance of the first touch lead 21 due to the reduction of the line width of the first line segment 21a is compensated by increasing the line width of the second line segment 21b. The reduction of the line width of the first line segment 21a on the reduction of the resistance of the first touch lead 21 is small, which is conducive to the design of the line width of the second line segment 21b, thereby avoiding that the line width of the second line segment 21*b* is designed too large. In applications, the array substrate and an opposite substrate are assembled to form the display panel, the light-shielding strips of the opposite substrate can be used to shield metal lines (such as touch leads and data lines), to prevent the metal lines from reflect the ambient light and to avoid affecting the display effect. If the line width of the second line segment 21*b* is too large, the width of the light-shielding strip corresponding to the second line segment 21*b* is increased, and the aperture ratio of the display panel is reduced. In view of the above, the configuration of the embodiments can increase the aperture ratio of the display panel.

Figure 15:
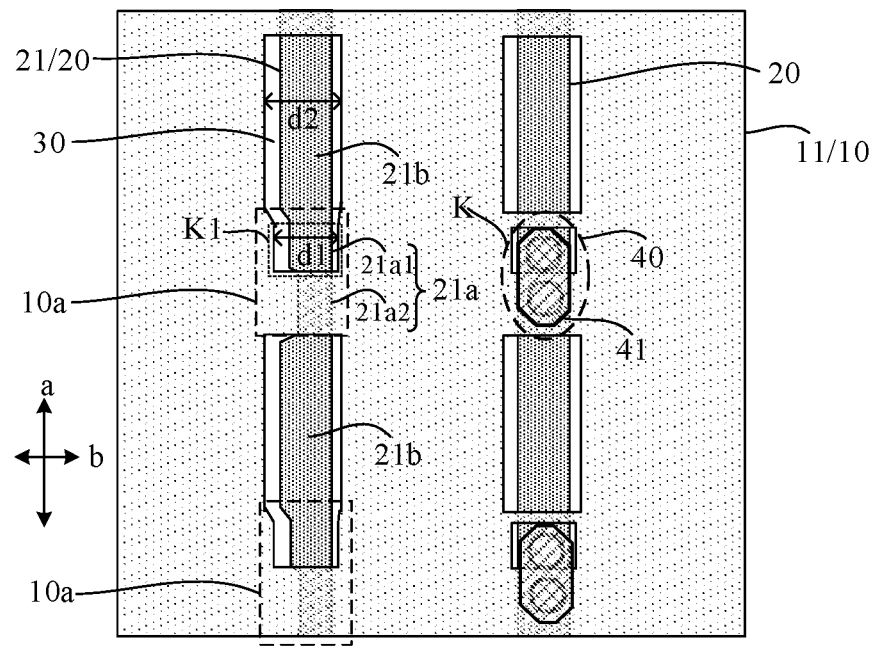
FIG. 15 is another enlarged schematic view illustrating the area Q1 of FIG. 1.

FIG. 15 is another enlarged schematic view illustrating the area Q1 of FIG. 1. In some other embodiments, as shown in FIG. 15, the first opening K1 is communicated with one groove 30. Along the second direction b, the width d1 of the first opening K1 is smaller than the width d2 of the groove 30. Compared with the position of the bridge structure 40, the first opening K1 corresponds to the opening K at the position of the bridge structure 40. The first opening K1 and the opening K are both formed in the patterning process of the touch electrode 10. With the configuration that the first opening K1 is communicated with the groove 30, the design of a mask that is used in the patterning process of the touch electrode 10 is simplified. The overlapping area between the first touch lead 21 and the first touch electrode 11 is reduced, and thus the load on the first touch lead 21 is reduced.

Figure 16:
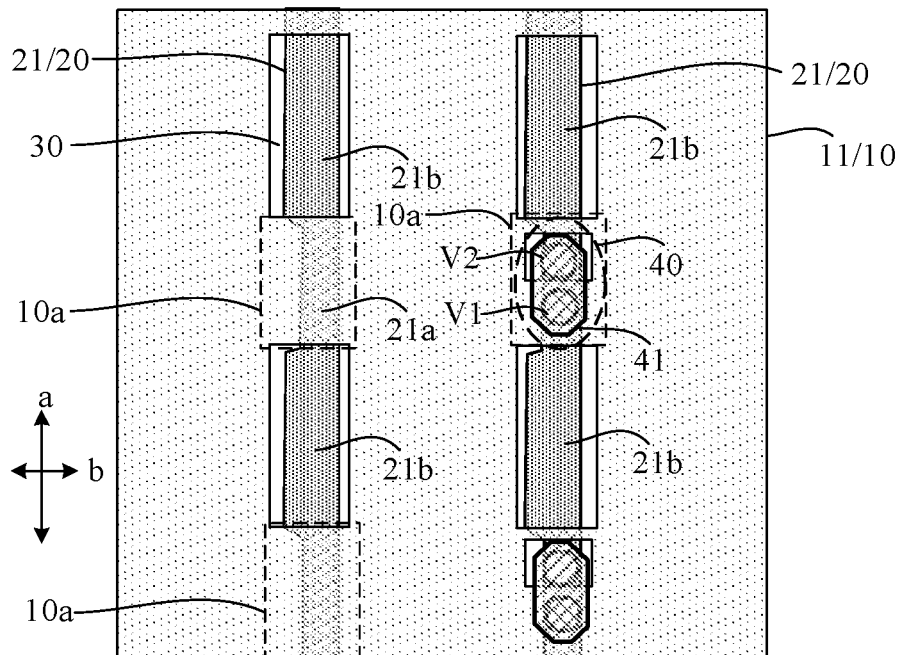
FIG. 16 is another enlarged schematic view illustrating the area Q1 of FIG. 1.

FIG. 16 is another enlarged schematic view illustrating the area Q1 of FIG. 1. In some other embodiments, as shown in FIG. 16, the bridge structure 40 is adjacent to the groove 30 along the first direction a. The bridge structure 40 includes a pad block 41. A first end of the pad block 41 is connected to the first portion 10*a* through the first via V1, and a second end of the pad block 41 is connected to the first line segment 21*a* through the second via V2. The schematic cross-sectional view of the bridge structure 40 can be understood with reference to FIG. 11, which will not be repeated herein. In the example embodiment shown in FIG. 16, two first touch leads 21 are illustrated, one of the two first touch leads 21 is insulated form and overlaps the first touch electrode 11, and the other one of the two first touch leads 21 overlaps the first touch electrode 11 and is connected to the first touch electrode 11 thought the bridge structure 40. In the embodiments, the touch lead 20 that overlaps the first touch electrode 11 and is connected to the first touch electrode 11 is configured to include line segments having different line widths. The touch leads 20 are to each other in shape. In this way, the mask used in the forming process of the touch leads 20 is simplified. The pattern density uniformity of the layer where the touch leads 20 are located is improved, ensuring etching precision and improving yield.

Figure 17:
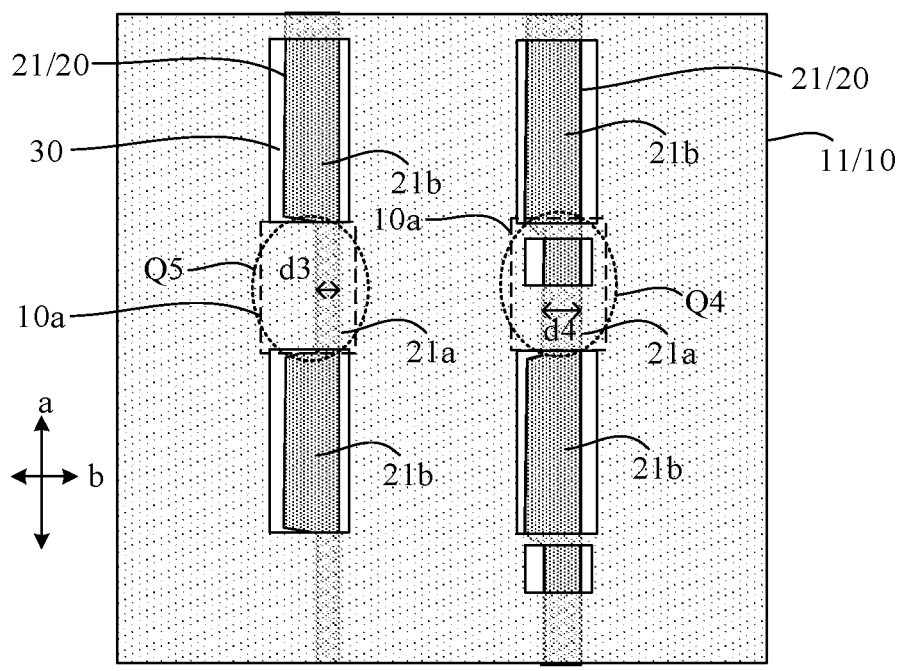
FIG. 17 is another enlarged schematic view illustrating the area Q1 of FIG. 1.

FIG. 17 is another enlarged schematic view illustrating the area Q1 of FIG. 1. In order to clearly show the line segments of the first touch lead 21 having different line widths, FIG. 17 just shows the first touch electrode 11 and two first touch leads 21, the area Q4 where the bridge structure 40 is located, and the area Q5 where the dummy bridge structure x40 is located. FIG. 17 does not show the details of the bridge structure 40 and the dummy bridge structure x40. In some embodiments, as shown in FIG. 17, the line width d3 of the first line segment 21*a* overlapping the dummy bridge structure x40 is smaller than the line width d4 of the first line segment 21*a* overlapping the bridge structure 40. In the embodiments, the touch lead 20 overlapping and insulated from the first touch electrode 11 and the touch lead 20 overlapping and electrically connected to the first touch electrode 11 both include line segments having different designs, such that the touch leads 20 are similar to each other in shape, simplifying the design of the mask. One first touch lead 21 overlaps and is electrically connected to at least one touch electrode 10. There is no coupling capacitance at the overlapping position between the first touch lead 21 and the touch electrode 10 that is electrically connected to the first touch lead 21, so the line width of the first line segment 21*a* at this overlapping position can be increased so as to compensate the reduction of the line width of first line segment 21 at other positions, thereby reducing the reduction of the local line width of some parts of the first touch lead 21 on the overall resistance.

Figure 18:
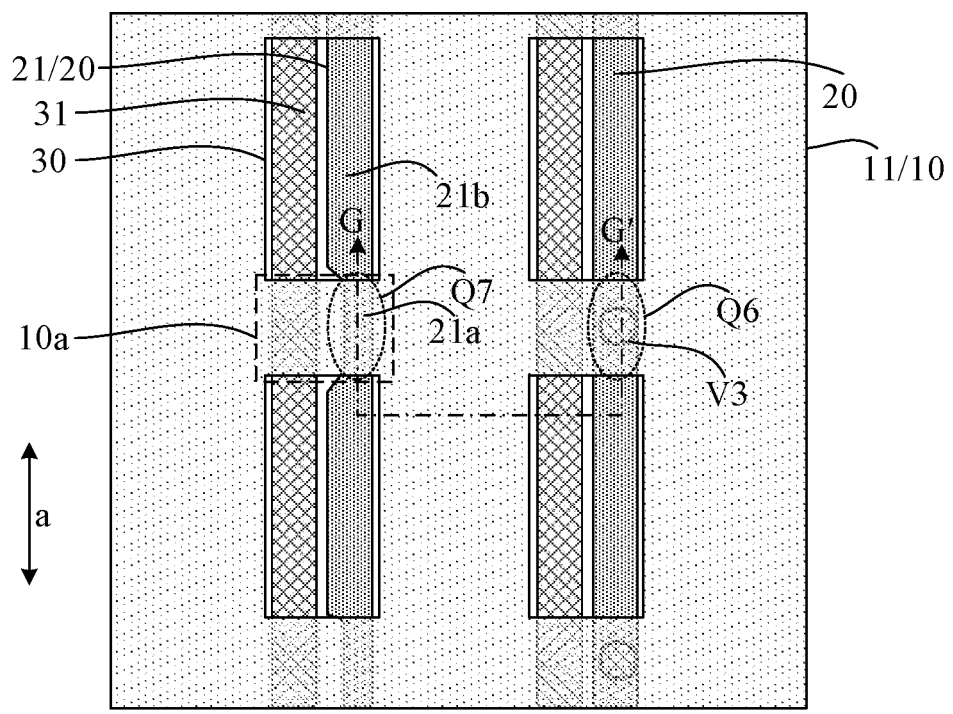
FIG. 18 is another enlarged schematic view illustrating the area Q1 of FIG. 1.
Figure 19:
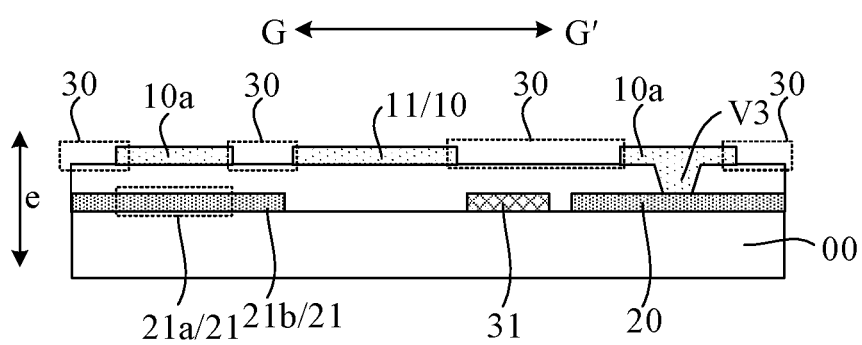
FIG. 19 is a schematic cross-sectional view along line G-G' of FIG. 18.

FIG. 18 is another enlarged schematic view illustrating the area Q1 of FIG. 1. FIG. 19 is a schematic cross-sectional view along line G-G' of FIG. 18. In some embodiments, as shown in FIG. 18, the array substrate includes a connection region Q6 and a dummy connection region Q7. In the connection region Q6, the first portion 10*a* overlaps the touch lead 20, and is connected to the touch lead 20 through a third via V3. That is, the connection region Q6 realizes the electrical connection between the touch lead 20 and the touch electrode 10. In the dummy connection region Q7, the first portion 10*a* is not electrically connected to the touch lead 20 overlapping the first portion 10*a*. Specifically, in the dummy connection region Q7, the first portion 10*a* overlaps the first line segment 21*a* of the first touch lead 21. The line width of the first line segment 21*a* of the first touch lead 21 is smaller than the line width of the second line segment 21*b*, and the second line segment 21*b* overlaps the groove 30. In the embodiments, the line widths of the line segments of the first touch lead 21 are different from each other, and different line segments of the first touch lead 21 overlap different portions of the first touch electrode 11 and have different line widths. The line width of the first line segment 21*a* is smaller than the line width of the second line segment 21*b*. The coupling capacitance generated due to the overlapping between the first line segment 21*a* and the first touch lead 11 is reduced by reducing the line width of the first line segment 21*a,* and thus the load of the first touch lead 21 is reduced, thereby reducing the load of the touch lead on the magnitude of the touch detection signal and improving the precision and accuracy of the touch detection.

In some embodiments, the first touch lead 21 has a target line width, the line width of the first line segment 21*a* is smaller than the target line width, and the line width of the second line segment 21*b* is greater than the target line width. That is, compared with the target line width, the line width of the first line segment 21*a* is reduced, and the line width of the second line segment 21*b* is increased. The effect of the reduction of the line width of the first line segment 21*a* on the overall resistance of the first touch lead 21 is compensated by increasing the line width of the second line segment 21*b*. In this way, the coupling capacitance between the first touch lead 21 and the first touch electrode 11 is reduced without increasing the resistance of the first touch lead 21, and thus the load of the touch lead is reduced, thereby reducing the load of the touch lead on the magnitude of the touch detection signal and improving the accuracy and precision of touch detection.

As shown in FIG. 18, the array substrate includes a data line 31 extending along the first direction a. The extending direction of the data line 31 is the same as the extending direction of the touch lead 20. As shown in FIG. 19, the data line 31 is located in a same layer as the touch lead 20. Along the direction e perpendicular to the plane of the substrate 00, at least one of the data lines 31 overlaps the groove 30. In the embodiments, the data line 31 and the touch lead 20 are located in the same layer, such that the data line 31 and the touch lead 20 can be formed in a same process step, simplifying the process flow, and reducing the thickness of the array substrate. The data line 31 at least partially overlaps the groove 30, and thus the coupling capacitance between the data line 31 and the touch electrode 10 is reduced, thereby reducing coupling capacitance on the voltage drop on the data line 31.

Figure 20:
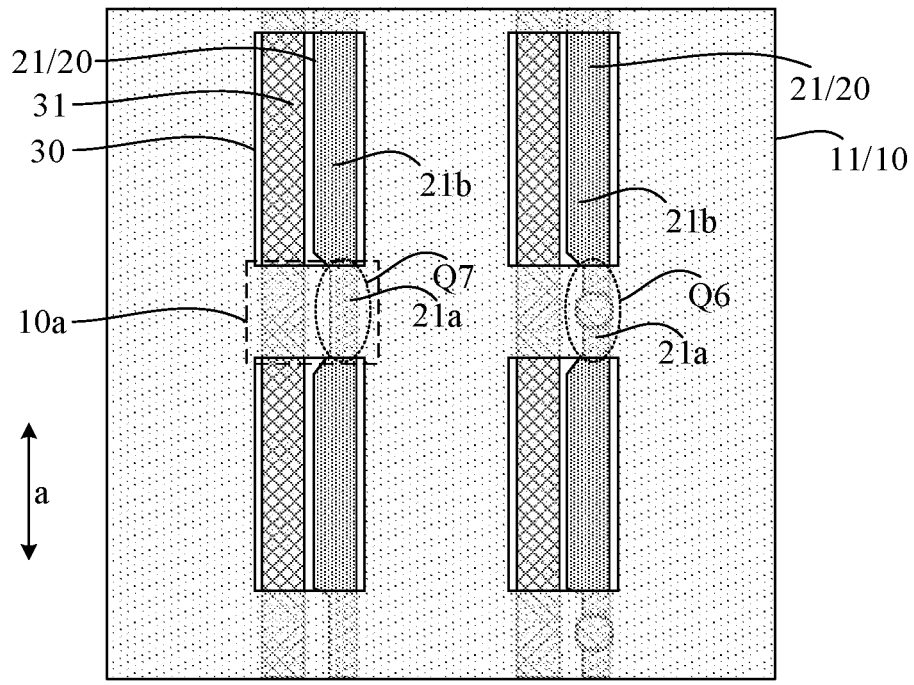
FIG. 20 is another enlarged schematic view illustrating the area Q1 of FIG. 1.

FIG. 20 is another enlarged schematic view illustrating the area Q1 of FIG. 1. In some embodiments, as show in FIG. 20, in at least one connection region Q6, the first portion 10a overlaps the first line segment 21a. As shown in FIG. 20, in the connection region Q6, the first touch electrode 11 is electrically connected to the touch lead 20. That is, the touch lead 20 overlapping and electrically connected to the first touch electrode 11 is configured to have line segments having different line widths. Therefore, the touch leads 20 are similar to each other in shape, and the mask is simplified. The pattern density uniformity of the layer where the touch leads 20 are located is improved, ensuring etching precision and improving yield.

Figure 21:
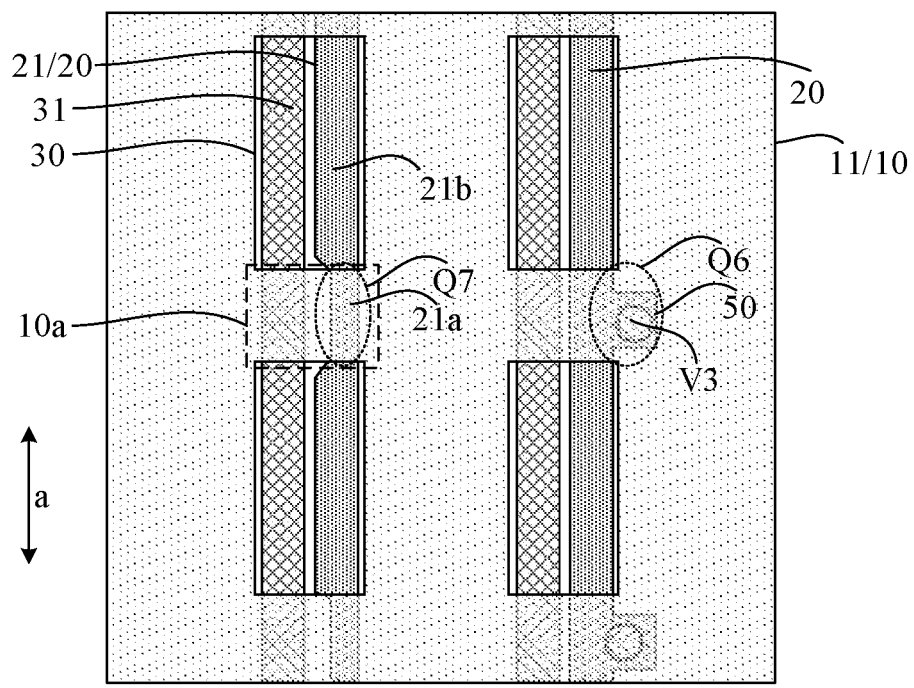
FIG. 21 is another enlarged schematic view illustrating the area Q1 of FIG. 1.

FIG. 21 is another enlarged schematic view illustrating the area Q1 of FIG. 1. In some other embodiments, as shown in FIG. 21, in the connection region Q6, the touch lead 20 includes a protruding portion 50 protruding along the second direction b intersecting the first direction a. The first portion 10a is connected to the protruding portion 50 though the third via V3. In the dummy connection region Q7, the first line segment 21a of the first touch lead 21 does not includes the protruding portion 50. For the touch lead 20 and the data line 31 adjacent to the touch lead 20, the protruding portion 50 of the touch lead 20 protrudes along a direction away from the data line 31. In the connection region Q6, the protruding portion 50 is used for realizing the electrical connection of the touch lead 20 and the touch electrode 10, avoiding the short circuit of the touch electrode 10 and the data line 31 due to position offset of the third via V3. In the dummy connection region Q7, the first line segment 21a is not provided with the protruding portion 50, and thus the overlapping area between the first line segment 21a and the touch electrode 11 is reduced, thereby reducing the coupling capacitance between the first line segment 21a and the touch electrode 11.

Figure 22:
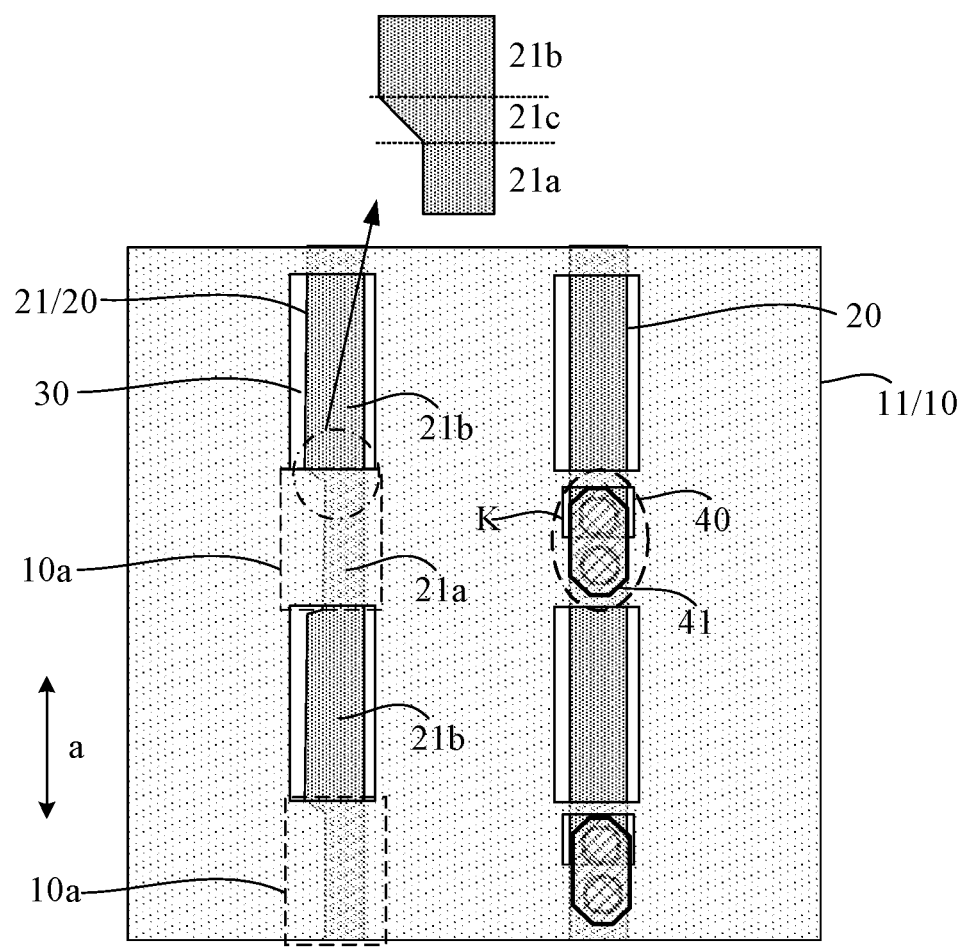
FIG. 22 is another enlarged schematic view illustrating the area Q1 of FIG. 1.

FIG. 22 is another enlarged schematic view illustrating the area Q1 of FIG. 1. In some other embodiments, as shown in FIG. 22, the first touch lead 21 includes a first transition line segment 21c, and the first transition line segment 21c is connected between the first line segment 21a and the second line segment 21b. A line width of the first transition line segment 21c gradually increases along a direction from the first line segment 21a to the second line segment 21b. In the embodiments, the first transition line segment 21c is provided between the first line segment 21a and the second line segment 21b that have different line widths, so the line width of the first touch lead 21 has a gradual transition. In this way, a right angle tip is avoided, and the undesired static electricity discharge due to point discharge is avoided.

Figure 23:
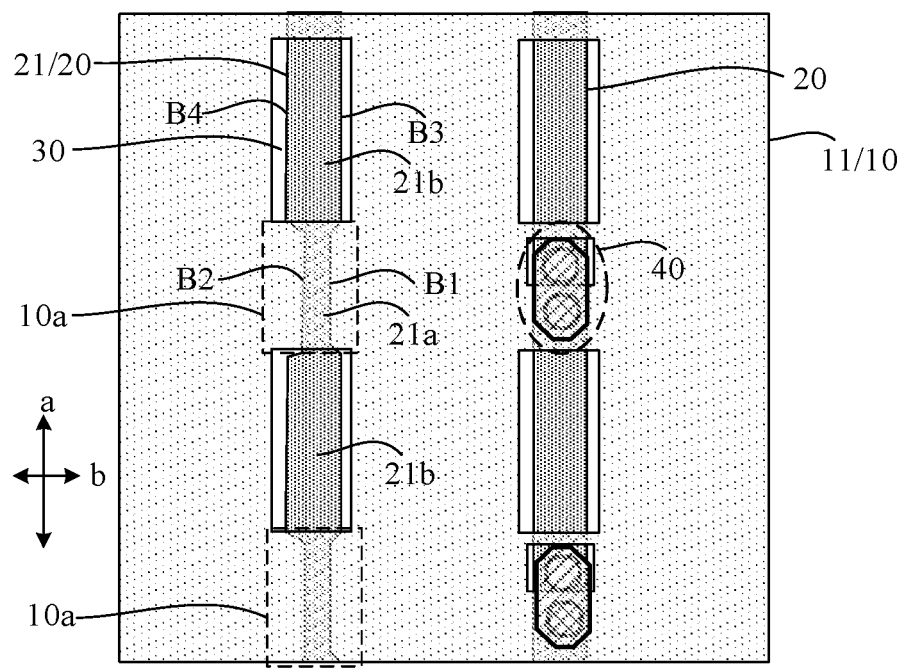
FIG. 23 is another enlarged schematic view illustrating the area Q1 of FIG. 1.

FIG. 23 is another enlarged schematic view illustrating the area Q1 of FIG. 1. In some embodiments, as shown in FIG. 23, the first line segment 21a includes a first edge B1 and a second edge B2 each extending along the first direction a. The first edge B1 and the second edge B2 are located at two sides of the first line segment 21a along the second direction b intersecting the first direction. The second line segment 21b includes a third edge B3 and a fourth edge B4 each extending along the first direction a. The third edge B3 and the fourth edge B4 are located at two sides of the second line segment 21b along the second direction b. The first edge B1 is recessed towards an interior of the first touch lead 21 relative to the third edge B3, and the second edge B2 is recessed towards the interior of the first touch lead 21 relative to the fourth edge B4. In the embodiments, two edges of the first line segment 21a recess inwards, reducing the line width of the first line segment 21a.

Figure 24:
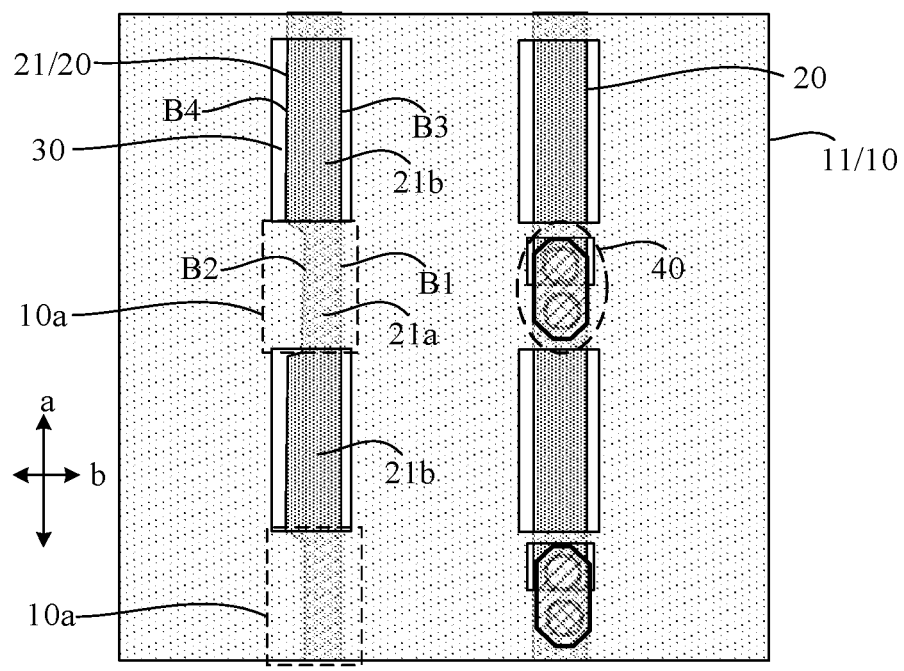
FIG. 24 is another enlarged schematic view illustrating the area Q1 of FIG. 1.

FIG. 24 is another enlarged schematic view illustrating the area Q1 of FIG. 1. In some embodiments, as shown in FIG. 24, the first line segment 21a includes a first edge B1 and a second edge B2 each extending along the first direction a. The first edge B1 and the second edge B2 are located at two sides of the first line segment 21a along the second direction b. The second line segment 21b includes a third edge B3 and a fourth edge B4 each extending along the first direction a. The third edge B3 and the fourth edge B4 are located at two sides of the second line segment 21b along the second direction b. The first edge B1 and the third edge B3 are located on a same straight line, and the second edge B2 is recessed towards an interior of the first touch lead 21 relative to the fourth edge B4. In the embodiments, one edge of the first line segment 21a recesses inwards, reducing the line width of the first line segment 21a.

Figure 25:
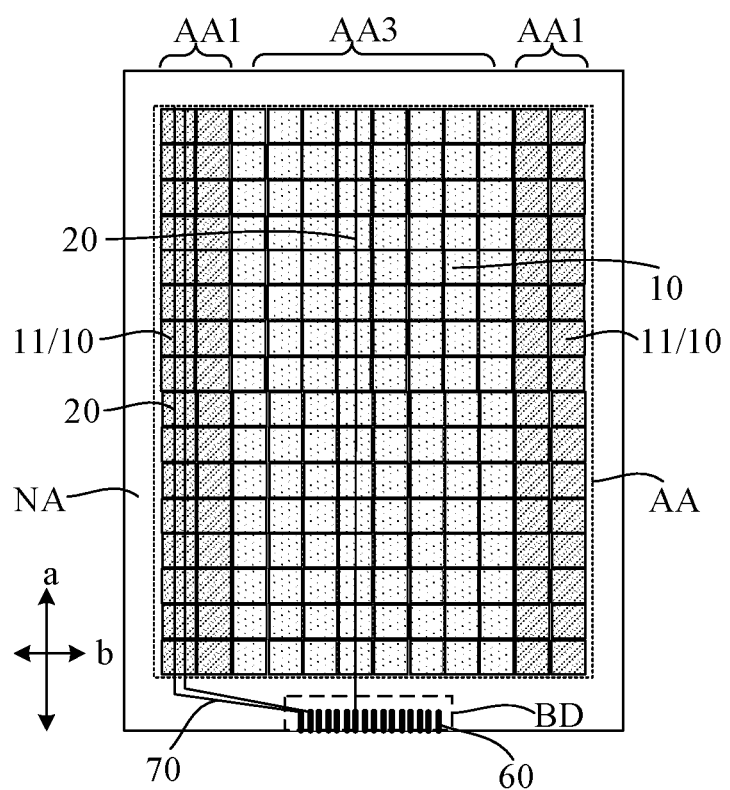
FIG. 25 is a schematic diagram of another array substrate according to embodiments of the present disclosure.

FIG. 25 is a schematic diagram of another array substrate according to embodiments of the present disclosure. In some embodiments, as shown in FIG. 25, the array substrate includes a display region AA and a bonding region BD. Along the first direction a, the bonding region BD is located on one side of the display region AA. The touch electrodes 10 and the touch leads 20 (three touch leads 20 are illustrated in FIG. 25 for simplification and schematic) are located in the display region AA. The bonding region BD is provided with multiple pads 60 configured to bind a driving circuit. The driving circuit is configured to drive the array substrate. The display region AA includes first display regions AA1 extending along the first direction a. The two first display regions AA1 are located at two ends of the display region AA along the second direction b. The first touch electrode 11 is provided in the first display region AA1. The display region AA includes a third display region AA3. The third display region AA3 is located between the two first display regions AA1. The touch lead 20 in the display region AA is connected to the pad 60 through a connection line 70 located in a non-display region NA. Since the first display regions AA1 are located at ends of the display region AA along the second direction b, a length of the connection line 70 connecting the pad 60 and the touch lead 20 located in the first display region AA1 is large. Among the touch electrodes 10 that are arranged in the same row along the second direction b, the touch electrode 10 located at a center of the display region AA has a smaller load, while the touch electrode 10 in the first display region AA1 has a larger load. In the embodiments, the first touch electrode 11 is provided in the first display region AA1, and at least one of the touch leads 20 overlapping the first touch electrode 11 is configured to have line segments having different line widths so as to reduce the coupling capacitance between the first touch electrode 11 and the touch electrode 20 and then reduce the load of the first touch electrode 11. In the embodiments, the difference between the load of the touch electrode 10 in the first display region AA1 and the load of the touch electrode 10 in the third display region AA3 is reduced, thereby improving the precision and accuracy of the touch detection.

Figure 26:
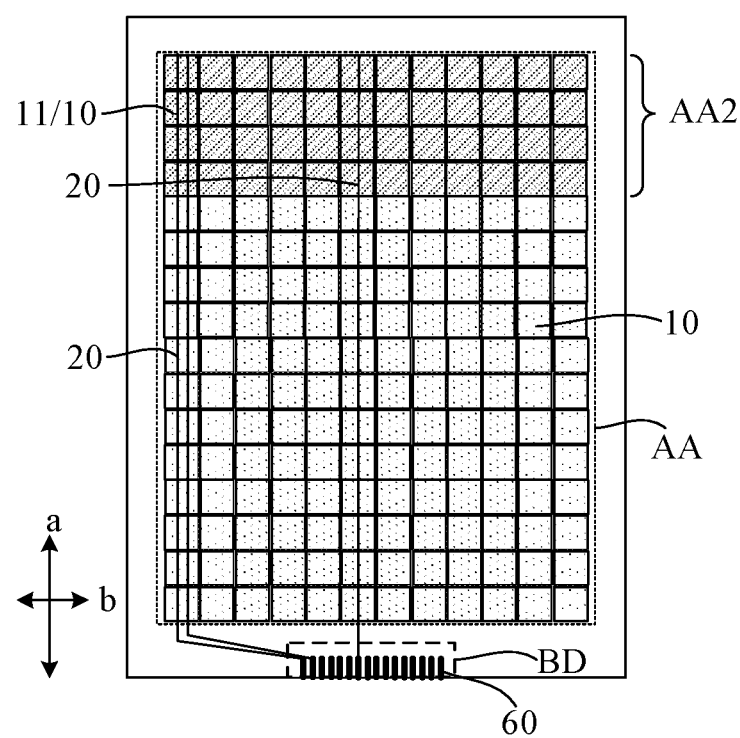
FIG. 26 is a schematic diagram of another array substrate according to embodiments of the present disclosure.

FIG. 26 is a schematic diagram of another array substrate according to embodiments of the present disclosure. In some embodiments, as shown in FIG. 26, the array substrate has a display region AA and a bonding region BD. Along the first direction a, the bonding region BD is located at a side of the display region AA. The bonding region BD is provided with multiple pads 60. The touch electrodes 10 and the touch leads 20 (three touch leads 20 are illustrated in FIG. 26 for simplification and schematic) are located in the display region AA. The display region AA includes a second display region AA2 extending along the second direction b. The second display region AA2 is located at an end of the display region AA away from the bonding region BD. The second display region AA2 includes the first touch electrode 11. The display region AA includes a fourth display region AA4. The fourth display region AA4 is located at a side of the third display region AA3 close to the bonding region BD. The touch lead 20 in the display region AA is connected to the pad 60 in the bonding region BD. Since the second display region AA2 is farther from the bonding region BD, the touch electrode 10 in the second display region AA2 has a larger load. In the embodiments, the first touch electrode 11 is provided in the second area AA2, and at least one of the touch leads 20 overlapping the first touch electrode 11 is configured to have line segments having different line widths so as to reduce the coupling capacitance between the first touch electrode 11 and the touch electrode 20 and then reduce the load of the first touch electrode 11. In the embodiments, the difference between the load of the touch electrode 10 in the second display region AA2 and the load of the touch electrode 10 in the fourth display region AA4 is reduced, thereby improving the precision and accuracy of the touch detection.

In some embodiments, the first display region AA1 and the second display region AA2 both include the first touch electrode 11, which is not shown in figures.

Figure 27:
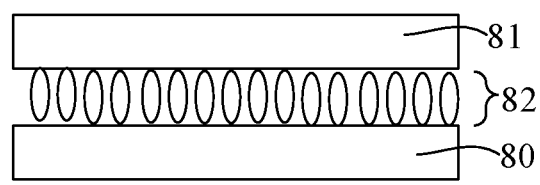
FIG. 27 is a schematic diagram of a display panel according to embodiments of the present disclosure.

Embodiments of the present disclosure further provide a display panel. FIG. 27 is a schematic diagram of a display panel according to embodiments of the present disclosure. As shown in FIG. 27, the display panel includes the array substrate 80 provided by any embodiment of the present disclosure, an opposite substrate 81, and a liquid crystal layer 82. In some embodiments, the opposite substrate 81 is a color filter substrate, and includes a color resistor layer and a black matrix. The structure of the array substrate 80 has been described in the above embodiments, and will not be repeated herein.

Figure 28:
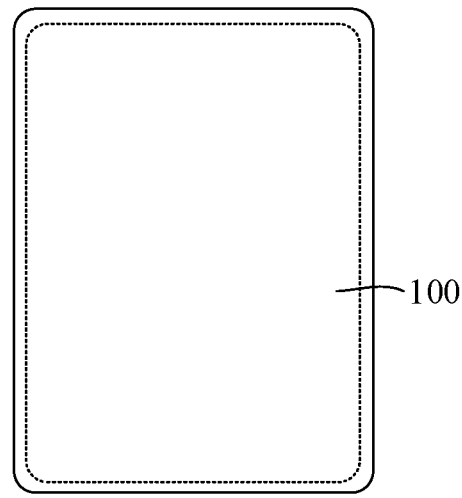
FIG. 28 is a schematic diagram of a display apparatus according to embodiments of the present disclosure.

Embodiments of the present disclosure provide a display device. FIG. 28 is a schematic diagram of a display apparatus according to embodiments of the present disclosure. As shown in FIG. 28, the display device includes the display panel 100 provided by any embodiment of the present disclosure. The display device may be, for example, a mobile phone, computer, tablet, television, vehicle display or smart wearable device and other electronic devices.

The above illustrates only some embodiments of the present disclosure and is not intended to limit the present disclosure. Any modifications, equivalent replacements, improvements, and the like made within the principle of the present disclosure are intended to be included within the protection scope of the present disclosure.

Finally, it should be understood that the above embodiments are merely intended to describe the technical solutions of the present disclosure, rather than limiting the present disclosure. Although the present disclosure is described in detail with reference to the above embodiments, those of ordinary skill in the art should understand that they can still make modifications to the technical solutions described in the above embodiments, or make equivalent replacements to some or all of the technical features in the technical solutions; and these modifications or replacements do not make the essence of corresponding technical solutions depart from the scope of the technical solutions of the embodiments of the present disclosure.

What is claimed is:

1. An array substrate, comprising:
   a substrate;
   a plurality of touch electrodes located at a side of the substrate, and the plurality of touch electrodes comprising a first touch electrode; and
   a plurality of touch leads located at the side of the substrate and each extending along a first direction,
   wherein the first touch electrode comprises a plurality of grooves and a plurality of first portions, each of the plurality of grooves is a non-physical structure of the first touch electrode, and each of the plurality of first portions is a physical structure of the first touch electrode; the plurality of grooves are arranged in an array along the first direction and a second direction intersecting with the first direction, and one of the plurality of first portions refers to all of the physical structure of the first touch electrode between any two adjacent grooves of the plurality of grooves along the first direction;
   wherein the plurality of touch leads comprises a first touch lead and a second touch lead and each of the first touch lead and the second touch lead is composed of first line segments and second line segments alternately arranged along the first direction;
   wherein along a direction perpendicular to a plane of the substrate, the first touch lead and the second touch lead overlap the first touch electrode, respectively, one of the first line segments overlaps a corresponding one of the plurality of first portions, and one of the second line segments overlaps a corresponding one of the plurality of grooves;
   wherein in the first touch lead, along the second direction, a line width of each of the first line segments is at least partially smaller than a line width of one of the second line segments adjacent thereto, and is entirely not greater than the line width of the second line segment adjacent thereto; and
   wherein in the second touch lead, along the second direction, a line width of each of the first line segments is entirely equal to the line width of the second line segment adjacent thereto.

2. The array substrate according to claim 1, further comprising:
   a dummy bridge structure adjacent to the one groove along the first direction,
   wherein the first line segment at least partially overlaps the dummy bridge structure along the direction perpendicular to the plane of the substrate.

3. The array substrate according to claim 2, wherein the dummy bridge structure comprises a dummy pad block, wherein the first line segment at least partially overlaps the dummy pad block along the direction perpendicular to the plane of the substrate.

4. The array substrate according to claim 3, further comprising:
   a plurality of pixel electrodes located in a same layer as the dummy pad block, wherein one of the plurality of pixel electrodes has a chamfer at a position adjacent to the dummy pad block.

5. The array substrate according to claim 3, wherein the dummy pad block has a length in the first direction, which is greater than a length of the dummy pad block in a second direction intersecting the first direction.

6. The array substrate according to claim 2, wherein the dummy bridge structure comprises at least one dummy via overlapping the first line segment along the direction perpendicular to the plane of the substrate.

7. The array substrate according to claim 2, wherein the first line segment comprises a first sub-segment and a second sub-segment, wherein the first sub-segment has a line width greater than a line width of the second sub-segment, and the second sub-segment overlaps the one first portion along the direction perpendicular to the plane of the substrate.

8. The array substrate according to claim 7, wherein the one first portion comprises a first opening overlapping the first sub-segment along the direction perpendicular to the plane of the substrate.

9. The array substrate according to claim 8, wherein the first opening is communicated with the one groove, and along a second direction intersecting the first direction, a width of the first opening is smaller than a width of the one groove.

10. The array substrate according to claim 2, further comprising:
a bridge structure, wherein the at least one groove comprises at least two grooves comprising the one groove and another groove, the at least one first portion comprises at least two first portions comprising the one first portion and another first portion, the plurality of touch leads further comprises a second touch lead comprising another first line segment, the bridge structure is adjacent to the another groove along the first direction and comprises a pad block, wherein the pad block has a first end connected to the another first portion through a first via and a second end connected to the another first line segment of the second touch lead through a second via.

11. The array substrate according to claim 10, wherein the another first line segment of the second touch lead overlaps the bridge structure, and the first line segment has a line width smaller than a line width of the another first line segment of the second touch lead.

12. The array substrate according to claim 2, further comprising:
a data line extending along the first direction and located in a different layer from the plurality of touch leads,
wherein one of the plurality of touch leads at least partially overlaps the data line along the direction perpendicular to the plane of the substrate.

13. The array substrate according to claim 1, having at least one connection region and at least one dummy connection region,
wherein the at least one first portion comprises at least two first portions, wherein the at least two first portions comprises the one first portion located in one dummy connection region of the at least one dummy connection region and another first portion located in one connection region of the at least one connection region;
wherein the another first portion overlaps one touch lead of the plurality of touch leads and is connected to the one touch lead through a third via;
wherein the one first portion is not connected to another touch lead of the plurality of touch leads that overlaps the one first portion, and
wherein the one first portion overlaps the first line segment.

14. The array substrate according to claim 13, wherein in one of the at least one connection area, one of the at least one first portion overlaps the first line segment.

15. The array substrate according to claim 13, wherein in one of the at least one connection region, one of the plurality of touch leads comprises a protruding portion protruding along a second direction intersecting the first direction, and the one first portion is connected to the protruding portion though the third via; and
wherein in one of the at least one dummy connection region, another one of the plurality of touch leads does not comprise the protruding portion.

16. The array substrate according to claim 13, further comprising:
a data line extending along the first direction and in a same layer as the plurality of touch leads, wherein the data line at least partially overlaps one of the at least one groove along the direction perpendicular to the plane of the substrate.

17. The array substrate according to claim 1, wherein the first touch lead comprises a first transition line segment connected between the first line segment and the second line segment, wherein a line width of the first transition line segment gradually increases along a direction from the first line segment to the second line segment.

18. The array substrate according to claim 1, wherein the first line segment comprises a first edge and a second edge that each extend along the first direction and that are located at two sides of the first line segment along a second direction intersecting the first direction, wherein the second line segment comprises a third edge and a fourth edge that each extend along the first direction and that are located at two sides of the second line segment along the second direction; and
wherein the first edge is recessed towards an interior of the first touch lead relative to the third edge, and the second edge is recessed towards the interior of the first touch lead relative to the fourth edge.

19. The array substrate according to claim 1, wherein in the first touch lead, each of the first line segments comprises a first edge and a second edge that each extend along the first direction and that are located at two sides of a corresponding first line segment along the second direction, and each of the second line segments comprises a third edge and a fourth edge that each extend along the first direction and that are located at two sides of a corresponding second line segment along the second direction; and
wherein the first edge and the third edge are located on a same straight line, and the second edge is recessed towards an interior of the first touch lead relative to the fourth edge.

20. The array substrate according to claim 1, having a display region and a bonding region, the bonding region being located at a side of the display region along the first direction, and the plurality of touch electrodes and the plurality of touch leads being located in the display region;
wherein the display region comprises a first display region extending along the first direction, wherein the first display region is located at an end of the display region along the second direction intersecting the first direction; and
wherein the first touch electrode is provided in the first display region.

21. The array substrate according to claim 1, having a display region and a bonding region, the bonding region being located at a side of the display region along the first direction, and the plurality of touch electrodes and the plurality of touch leads being located in the display region,
wherein the display region comprises a second display region extending along a second direction intersecting the first direction, wherein the second display region is located at an end of the display region away from the bonding region, and wherein the first touch electrode is provided in the second display region.

22. A display panel, comprising an array substrate, wherein the array substrate comprises:

a substrate;

a plurality of touch electrodes located at a side of the substrate, and the plurality of touch electrodes comprising a first touch electrode; and a plurality of touch leads located at the side of the substrate and each extending along a first direction, wherein the first touch electrode comprises a plurality of grooves and a plurality of first portions, each of the plurality of grooves is a non-physical structure of the first touch electrode, and each of the plurality of first portions is a physical structure of the first touch electrode; the plurality of grooves are arranged in an array along the first direction and a second direction intersecting with the first direction, and one of the plurality of first portions refers to all of the physical structure of the first touch electrode between any two adjacent grooves of the plurality of grooves along the first direction;

wherein the plurality of touch leads comprises a first touch lead and a second touch lead and each of the first touch lead and the second touch lead is composed of first line segments and second line segments alternately arranged along the first direction;

wherein along a direction perpendicular to a plane of the substrate, the first touch lead and the second touch lead overlap the first touch electrode, respectively, one of the first line segments overlaps a corresponding one of the plurality of first portions, and one of the second line segments overlaps a corresponding one of the plurality of grooves;

wherein in the first touch lead, along the second direction, a line width of each of the first line segments is at least partially smaller than a line width of one of the second line segments adjacent thereto, and is entirely not greater than the line width of the second line segment adjacent thereto; and wherein in the second touch lead, along the second direction, a line width of each of the first line segments is entirely equal to the line width of the second line segment adjacent thereto.

23. A display device, comprising a display panel, wherein the display panel comprises an array substrate, wherein the array substrate comprises:

a substrate;

a plurality of touch electrodes located at a side of the substrate, and the plurality of touch electrodes comprising a first touch electrode; and a plurality of touch leads located at the side of the substrate and each extending along a first direction, wherein the first touch electrode comprises a plurality of grooves and a plurality of first portions, each of the plurality of grooves is a non-physical structure of the first touch electrode, and each of the plurality of first portions is a physical structure of the first touch electrode; the plurality of grooves are arranged in an array along the first direction and a second direction intersecting with the first direction, and one of the plurality of first portions refers to all of the physical structure of the first touch electrode between any two adjacent grooves of the plurality of grooves along the first direction;

wherein the plurality of touch leads comprises a first touch lead and a second touch lead and each of the first touch lead and the second touch lead is composed of first line segments and second line segments alternately arranged along the first direction;

wherein along a direction perpendicular to a plane of the substrate, the first touch lead and the second touch lead overlap the first touch electrode, respectively, one of the first line segments overlaps a corresponding one of the plurality of first portions, and one of the second line segments overlaps a corresponding one of the plurality of grooves;

wherein in the first touch lead, along the second direction, a line width of each of the first line segments is at least partially smaller than a line width of one of the second line segments adjacent thereto, and is entirely not greater than the line width of the second line segment adjacent thereto; and wherein in the second touch lead, along the second direction, a line width of each of the first line segments is entirely equal to the line width of the second line segment adjacent thereto.

* * * * *